(12) United States Patent
Griesbaum et al.

(10) Patent No.: US 6,427,710 B1
(45) Date of Patent: Aug. 6, 2002

(54) END SIDE HOLDING DEVICE FOR A VENT PIPE OF A FUEL TANK AND METHOD OF MAKING SAME

(75) Inventors: Josef Griesbaum, Eberdingen; Ulrich Essig, Wendlingen; Antonious Kollias, Waldkraiburg, all of (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 09/659,079

(22) Filed: Sep. 11, 2000

(30) Foreign Application Priority Data

Sep. 10, 1999 (DE) .......................................... 199 43 292

(51) Int. Cl.[7] ................................................ F16K 24/00
(52) U.S. Cl. ................... 137/15.09; 137/587; 251/144; 285/921
(58) Field of Search ........................ 285/921; 251/144; 137/587, 588, 15.09, 315.01

(56) References Cited

U.S. PATENT DOCUMENTS

| 4,730,652 | A | * | 3/1988 | Bartholomew | .............. | 141/302 |
|---|---|---|---|---|---|---|
| 4,960,153 | A | * | 10/1990 | Bergsma | ...................... | 137/587 |
| 4,966,189 | A | * | 10/1990 | Harris | ......................... | 137/587 |
| 5,826,918 | A | * | 10/1998 | Bowles et al. | ................. | 285/24 |
| 5,954,091 | A | * | 9/1999 | Leadford | ..................... | 137/587 |
| 6,189,567 | B1 | * | 2/2001 | Foltz | .......................... | 137/587 |

FOREIGN PATENT DOCUMENTS

| DE | 19751361 A1 | 11/1997 |
|---|---|---|
| FR | 2781259 A1 | 7/1998 |
| GB | 1047759 | 10/1963 |

* cited by examiner

Primary Examiner—A. Michael Chambers
(74) Attorney, Agent, or Firm—Crowell & Moring LLP

(57) ABSTRACT

The end-side holding device for a vent pipe of a fuel tank on a stationary wall of a motor vehicle is constructed in two parts and is composed of a connecting piece connected with the vent pipe and of a counterpart. The end region of the connecting piece, which faces away from the vent pipe, and the counterpart extend from opposite sides of the wall in the area of the recess and are pushed into one another until they interact by way of a releasable detent connection.

26 Claims, 2 Drawing Sheets

END SIDE HOLDING DEVICE FOR A VENT PIPE OF A FUEL TANK AND METHOD OF MAKING SAME

BACKGROUND AND SUMMARY OF THE INVENTION

This application claims the priority of German patent document 199 43 292.9, filed Sep. 10, 1999, the disclosure of which is expressly incorporated by reference herein.

The invention relates to an end-side holding device for a vent pipe of a fuel tank on a stationary wall of a motor vehicle, the holding device being connected to one end of the vent pipe and a recess for fixing the holding device being provided on the wall.

In a known arrangement of the initially mentioned type, the end-side holding device comprises a bent spout made of rubber or plastic, an end region of the spout being pushed onto an end of the vent pipe formed by a polyamide tube. The spout, which is connected with the vent pipe, is then inserted with the other end region into the recess of the stationary wall. By means of two ring-shaped spaced lip sections, the one-part spout is supported on opposite sides of the wall.

This arrangement has the disadvantage that the inserting of the spout into the recess of the stationary wall of the vehicle is cumbersome and time-consuming.

It is an object of the invention to further develop a holding device for a free end of a vent pipe of a fuel tank such that, while the fastening is secure, the mounting of the holding device is simplified.

According to the invention, this object is achieved by providing an end-side holding device for a vent pipe of a fuel tank on a stationary wall of a motor vehicle, the holding device being connected to one end of the vent pipe and a recess for fixing the holding device being provided on the wall, wherein the holding device has a two-part construction and is composed of a connecting piece connected with the vent pipe, and of a counterpart, wherein an end region of the connecting piece which faces away from the vent pipe, and the counterpart extend from opposite sides of the stationary wall in an area of the recess and are pushed into one another until they interact by way of a releasable detect connection.

Further advantageous features of preferred embodiments of the invention are described below and in the claims.

Principal advantages achieved by the invention are that, as a result of the two-part construction of the holding device, the mounting on the stationary wall is significantly simplified.

The free end of the vent pipe is simply pushed onto the connecting piece of the holding device. A Christmas tree profile provided on the outer circumference of the connecting piece provides a secure fit of the vent pipe. A radial collar on the connecting piece bounds the pushed-on position of the vent pipe. The connecting piece and the counterpart interacting with the connecting piece by way of a releasable detent connection are inserted from opposite sides into the recess of the stationary wall section and receive the wall between one another.

The holding device according to the invention permits a simple fixing of the free end of the vent pipe at an inaccessible point. The detent connection is formed by elastic holding webs of the counterpart and projecting holding noses of the connecting piece, which interact with the counterpart, and can be produced in a simple manner and at reasonable cost.

Other objects, advantages and novel features of the present invention will become apparent from the following detailed description of the invention when considered in conjunction with the accompanying drawings.

DETAILED DESCRIPTION OF THE DRAWINGS

Figure 1:
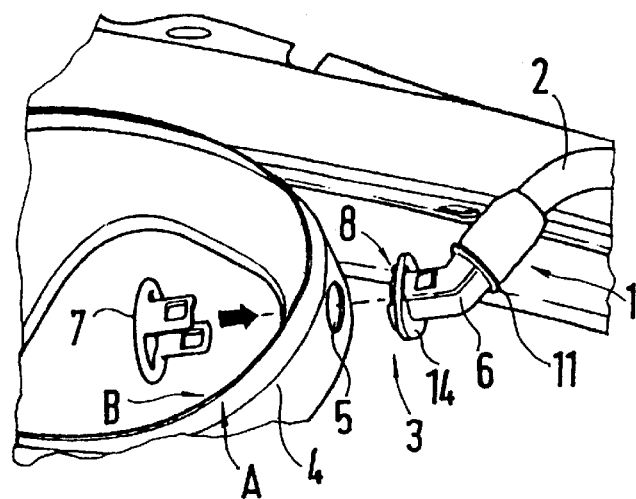
FIG. 1 is a perspective view of a free end of a vent pipe which can be fixed by a two-part holding device on a stationary wall of the motor vehicle, the two parts of the holding device not yet being connected with one another, constructed according to a preferred embodiment of the invention.
Figure 3:
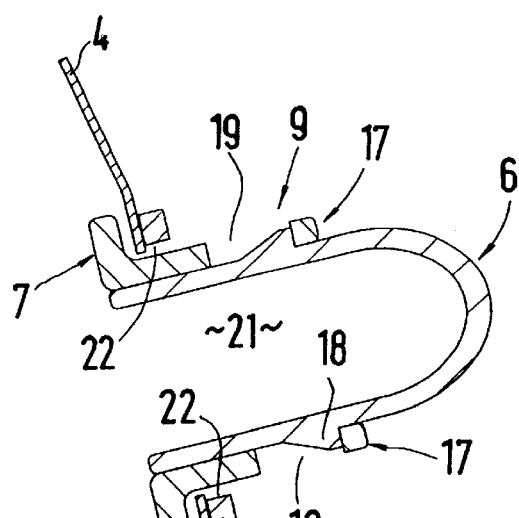
FIG. 3 is a sectional view according to Line III—III of FIG. 2.
Figure 4:
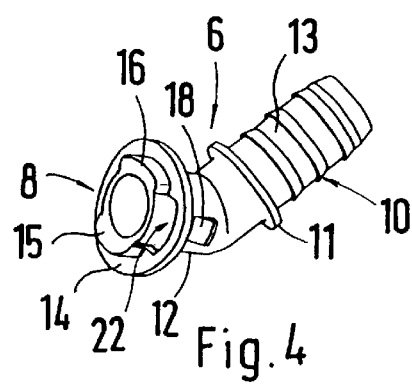
FIG. 4 is a perspective view of the connecting piece of the holding device.
Figure 5:
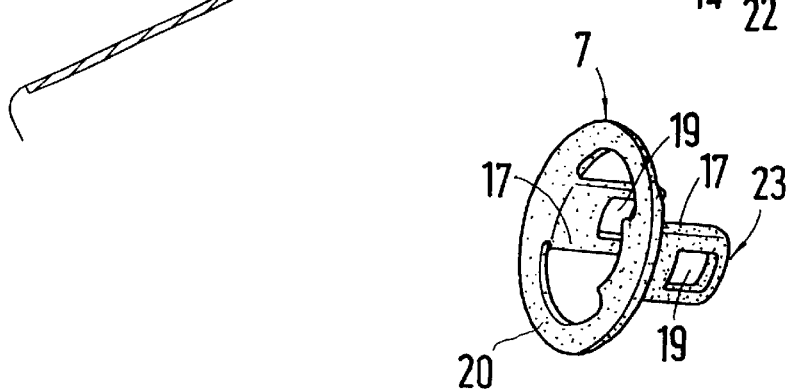
FIG. 5 is a perspective view of the counterpart of the holding device.
Figure 2:
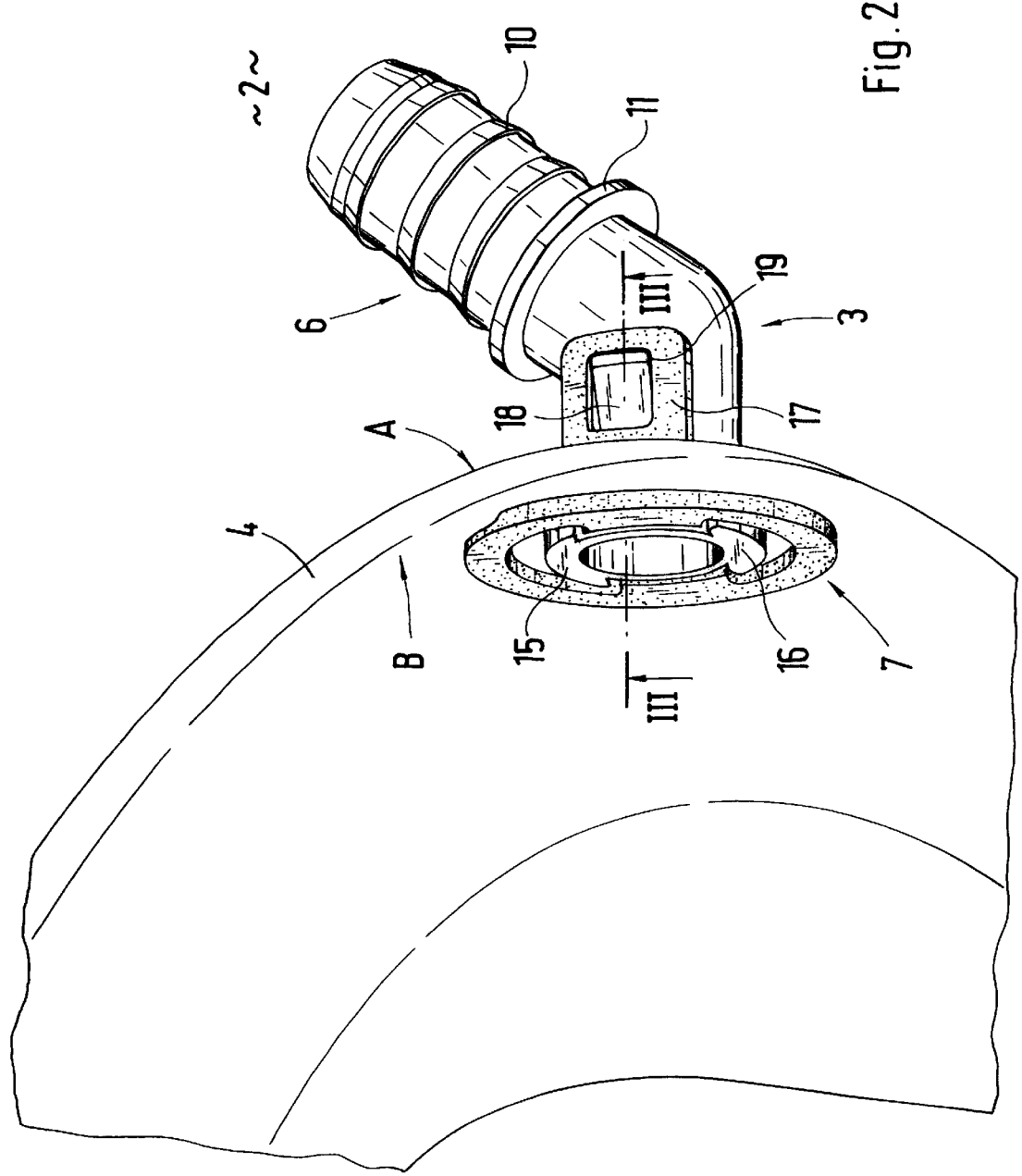
FIG. 2 is an enlarged cutout corresponding to FIG. 1 with a mounted holding device, but without the vent pipe.

By utilizing a holding device 3, one end 1 of a vent pipe 2 of a fuel tank, which is not shown in detail, can be fixed on a stationary wall 4. In the embodiment shown, the vent pipe 2 is formed by a tube made of a suitable plastic material, the end which is not shown being connected to an activated charcoal filter which is not shown in detail. The other end 1 of the vent pipe 2 is connected with the atmosphere. For fastening the holding device 3 to the stationary wall 4, a corresponding recess 5 is provided on the stationary wall 4.

According to the invention, the holding device 3 made of a plastic material is constructed in two parts and is composed of a connecting piece 6 connected with the vent pipe 2 and of a counterpart 7. The end region 8 of the connecting piece 6, which faces away from the vent pipe 2, and the counterpart 7 extend from opposite sides A, B in the area of the recess 5 to the wall 4 and are then pushed into one another, the two parts 6, 7 being detachably connected with one another by way of a detent connection 9.

In the region of the pushed-on vent pipe 2, the connecting piece 6 has a Christmas tree profile 10 on the exterior side. For bounding the pushed-on vent pipe 2, a surrounding radial collar 11 is constructed on the connecting piece 6 adjacent to the rearward end of the Christmas tree profile 10.

In the embodiment shown, the connecting piece 6 is constructed as an elbow-shaped connecting piece which is composed of two bent legs 12, 13. However, the connecting piece 6 may also have a straight-line course. On the end region 8 facing away from the vent pipe 2, the connecting piece 6 has a radial supporting collar 14 as well as axially projecting circular-ring sections, the supporting collar 14 being supported on one side A of the wall 4, and the two circular-ring sections 15, 16 projecting in sections into the recess 5 of the wall 4.

The releasable detent connection 9 is formed by elastic holding webs 17 of the counterpart 7 and by projecting holding noses 18 of the connecting piece 6 which interact with the counterpart 7, the holding webs 17 provided with the recesses 19 reaching behind the holding noses 18.

In the embodiment shown, at least two spaced elastic holding webs 17 extend away from an elliptical supporting collar 20 of the counterpart 7, the holding webs 17 extending approximately at a right angle with respect to the plane of the supporting collar 20. Rectangular recesses 19 for the connecting-piece-side holding noses 18 are constructed on both holding webs 17.

Guide slots 22 for the guiding-through of the holding webs 17 of the counterpart 7 are provided on the radial supporting collar 14 of the connecting piece 6 outside the interior tube section 21. The guide slots 22 are slightly wider than the holding webs 17 to be guided through. In the top view, the holding webs 17 and the guide slots 22 have a bent shape. Disposed in front of the supporting collar 14, the two circular-ring sections 15, 16 of the connecting piece 6 extend between the two opposite guide slots 22.

Viewed in the slide-in direction of the counterpart 7, the two radially projecting holding noses 18 are then supported on the supporting collars 14 on the connecting piece 6. The rectangular recesses 19 on the holding webs 17 are slightly wider than the width of the holding noses 18. During the assembly, the forward ends 23 of the holding webs 17 are bent outward by the oblique planes of the holding noses 18 until the ends 23 reach behind the holding noses 18. Subsequently, the holding webs 17 move back toward the interior in the direction of the connecting piece 6.

In the embodiment shown, the wall 4 has a bent shape in the top view. For this reason, the supporting collar 14 is also provided with a corresponding camber. However, the wall 4 and the supporting collar 14 may have a straight-line shape.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of making a fuel tank assembly including a fuel tank having a stationary wall with a through opening, a vent pipe, and a holding device for holding an end of the vent pipe on the stationary wall at the opening, said method comprising:

providing a connecting piece and attaching the same to an end of the vent pipe, providing a counterpart, inserting the connecting piece and counterpart through the opening from respective opposite sides of the wall and detachably connecting the connecting piece and counterpart by way of a detent connection.

2. A method of making a fuel tank assembly according to claim 1, wherein the connecting piece has a Christmas tree profile on an exterior side in a region of the pushed-on vent pipe.

3. A method of making a fuel tank assembly according to claim 2, wherein for bounding the pushed-on vent pipe, a radial collar is constructed on the connecting piece adjacent to the Christmas tree profile.

4. A method of making a fuel tank assembly according to claim 1, wherein in the end region facing away from the vent pipe, the connecting piece has a radial supporting collar as well as axially projecting circular-ring sections, the supporting collar being supported on one side of the wall and the circularring sections projecting in sections into the recess of the wall.

5. A method of making a fuel tank assembly according to claim 1, wherein the releasable detent connection is formed by elastic holding webs of the counterpart and projecting holding noses of the connecting piece which interact with the counterpart, the holding webs being provided with recesses reaching behind the holding noses.

6. A method according to claim 1, wherein said counterpart and connecting piece are configured to receive the wall between them when in a position fixing the holding device on the wall.

7. End-side holding device for a vent pipe of a fuel tank on a stationary wall of a motor vehicle, the holding device being connected to one end of the vent pipe and a recess for fixing the holding device being provided on the wall, wherein the holding device has a two-part construction and is composed of a connecting piece connected with the vent pipe, and of a counterpart, wherein an end region of the connecting piece, which faces away from the vent pipe, and the counterpart extend from opposite sides of the stationary wall in an area of the recess and are pushed into one another until they interact by way of a releasable detent connection.

8. Holding device according to claim 7, wherein the connecting piece has a Christmas tree profile on an exterior side in a region of the pushed-on vent pipe.

9. Holding device according to claim 8, wherein for bounding the pushed-on vent pipe, a radial collar is constructed on the connecting piece adjacent to the Christmas tree profile.

10. Holding device according to claim 9, wherein the releasable detent connection is formed by elastic holding webs of the counterpart and projecting holding noses of the connecting piece which interact with the counterpart, the holding webs being provided with recesses reaching behind the holding noses.

11. Holding device according to claim 10, wherein at least two holding webs extend away from a ring-shaped supporting collar of the counterpart, the holding webs having rectangular recesses.

12. Holding device according to claim 7, wherein in the end region facing away from the vent pipe, the connecting piece has a radial supporting collar as well as axially projecting circular-ring sections, the supporting collar being supported on one side of the wall and the circular-ring sections projecting in sections into the recess of the wall.

13. Holding device according to claim 12, wherein the releasable detent connection is formed by elastic holding webs of the counterpart and projecting holding noses of the connecting piece which interact with the counterpart, the holding webs being provided with recesses reaching behind the holding noses.

14. Holding device according to claim 13, wherein at least two holding webs extend away from a ring-shaped supporting collar of the counterpart, the holding webs having rectangular recesses.

15. Holding device according to claim 7, wherein the releasable detent connection is formed by elastic holding webs of the counterpart and projecting holding noses of the connecting piece which interact with the counterpart, the holding webs being provided with recesses reaching behind the holding noses.

16. Holding device according to claim 15, wherein at least two holding webs extend away from a ring-shaped supporting collar of the counterpart, the holding webs having rectangular recesses.

17. Holding device according to one claim 15, wherein guide slots for guiding-through the holding webs of the counterpart are provided on the ring shaped supporting collar of the connecting piece, and wherein the holding noses are constructed on the supporting collars on the connecting piece.

18. Holding device according to claim 7, wherein the connecting piece is constructed as an elbow-shaped connecting piece.

19. A holding device according to claim 7, wherein the end region of the connecting piece and the counterpart are configured to receive the wall between them when in a position fixing the holding device on the wall.

20. Vehicle fuel tank assembly including a fuel tank having a stationary wall with an opening, a vent pipe, and a holding device for holding an end of the vent pipe on the stationary wall at the opening, said holding device comprising:

a connecting piece connected with the vent pipe, and
   a counterpart,
      wherein said counterpart and connecting piece are insertable through the opening in the wall from respective opposite sides and are pushed into one another to form a releasable detent connection.

21. An assembly according to claim 20, wherein the connecting piece has a Christmas tree profile on an exterior side in a region of the pushed-on vent pipe.

22. An assembly according to claim 21, wherein for bounding the pushed-on vent pipe, a radial collar is constructed on the connecting piece adjacent to the Christmas tree profile.

23. An assembly according to claim 22, wherein for bounding the pushed-on vent pipe, a radial collar is constructed on the connecting piece adjacent to the Christmas tree profile.

24. An assembly according to claim 20, wherein in the end region facing away from the vent pipe, the connecting piece has a radial supporting collar as well as axially projecting circular-ring sections, the supporting collar being supported on one side of the wall and the circular-ring sections projecting in sections into the recess of the wall.

25. An assembly according to claim 20, wherein the releasable detent connection is formed by elastic holding webs of the counterpart and projecting holding noses of the connecting piece which interact with the counterpart, the holding webs being provided with recesses reaching behind the holding noses.

26. An assembly according to claim 20, wherein said counterpart and connecting piece are configured to receive the wall between them when in a position fixing the holding device on the wall.

\* \* \* \* \*